US010187613B2

(12) United States Patent
Moss et al.

(10) Patent No.: US 10,187,613 B2
(45) Date of Patent: *Jan. 22, 2019

(54) NETWORKED MONITOR APPLIANCE

(71) Applicant: S2 Security Corporation, Framingham, MA (US)

(72) Inventors: John L. Moss, Wayland, MA (US); Kenneth J. Schroder, Waltham, MA (US); Ajay Mahagaokar, Westborough, MA (US); Christopher Firth, Bellingham, MA (US)

(73) Assignee: S2 SECURITY CORPORATION, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,901

(22) Filed: Feb. 21, 2018

(65) Prior Publication Data
US 2018/0184049 A1 Jun. 28, 2018

Related U.S. Application Data

(63) Continuation of application No. 14/792,888, filed on Jul. 7, 2015, now Pat. No. 9,918,045.

(51) Int. Cl.
| H04N 7/18 | (2006.01) |
| G06F 3/0486 | (2013.01) |
| H04N 5/445 | (2011.01) |
| G06F 3/0481 | (2013.01) |

(52) U.S. Cl.
CPC ........... *H04N 7/181* (2013.01); *G06F 3/0481* (2013.01); *G06F 3/0486* (2013.01); *H04N 5/44591* (2013.01); *G06F 2203/04803* (2013.01)

(58) Field of Classification Search
None
See application file for complete search history.

(56) References Cited

U.S. PATENT DOCUMENTS

| 9,615,065 | B2 | 4/2017 | Frencette et al. | |
| 9,918,045 | B1* | 3/2018 | Moss | H04N 7/181 |
| 9,967,524 | B2 | 5/2018 | Brunet et al. | |
| 2006/0026495 | A1* | 2/2006 | Shaw | G06F 17/212 |
| | | | | 715/250 |
| 2010/0095335 | A1* | 4/2010 | Wilson | H04B 3/546 |
| | | | | 725/105 |
| 2013/0332856 | A1* | 12/2013 | Sanders | G06F 3/0481 |
| | | | | 715/753 |
| 2015/0327114 | A1* | 11/2015 | Gupta | H04W 40/248 |
| | | | | 370/235 |
| 2016/0314762 | A1* | 10/2016 | Lee | G09G 3/001 |
| 2016/0366118 | A1* | 12/2016 | Wang | H04L 63/083 |
| 2017/0094328 | A1* | 3/2017 | Herrmann | H04N 21/235 |

* cited by examiner

*Primary Examiner* — Eileen M Adams
(74) *Attorney, Agent, or Firm* — Armis IP Law, LLC

(57) ABSTRACT

An integrated security system operating over a network includes networked video sources, networked monitor appliances and networked monitor appliance controllers. Video streams are processed by the networked monitor appliances for display on a monitor.

26 Claims, 16 Drawing Sheets

NETWORKED MONITOR APPLIANCE

RELATED APPLICATIONS

This is a continuation of pending application Ser. No. 14/792,888 filed Jul. 7, 2015 which application is hereby incorporated herein by reference in its entirety.

FIELD OF THE INVENTION

This invention relates generally to security systems, surveillance and more particularly to networked video systems and networked monitor appliances.

BACKGROUND OF THE INVENTION

In security and access control applications, video capabilities are an important feature at access points in an individual office or a facility including one or more buildings and at residences. The installation of cameras and display monitors, the addition of new features and the operation of conventional systems is often complicated by the use of various incompatible communications channels required by the individual systems. Managing the configuration of cameras and display monitors which are often remote from one another is complicated in conventional systems. Displaying video streams from sources other than from known sources and cameras directly connected to the monitors is not easily accomplished.

FIG. 1 depicts a conventional security system 10 including an access control system 12 having monitoring station 14. Current security systems use a combination of coax (analog) connected cameras and Internet Protocol (IP) connected cameras and some systems use only IP connected video cameras. The monitoring station 14 is typically a dedicated personal computer running a software application specifically tailored to the security system 10. The correspondence between a physical location and each module 18 is determined by a physical wiring connection at installation time. The security system 10 further includes a separate video system 30. The video monitoring system typically includes a video display 34, a video mixer 36 (also referred to a video multiplexer 36) and a plurality of video cameras 38. The cameras 38, multiplexer 36 and display 34 are generally coupled via coaxial cable (coax). The cameras 38a-38n are typically controlled by the video display 34 over control lines 35a-35n to provide pan, tilt and zoom (PTZ) functions. An optional video tape recorder (VCR) (not shown) or digital video recorder (DVR) is connected to the mixer 36 to provide a temporary storage of images captured by the cameras 38. Conventional systems can also accommodate known networked based IP (or web) cameras 39a-39n.

The installation of access control, video, and audio devices in conventional systems is complicated by the panel topology and the use of a combination of video cable, and cable wiring which is used to identify a specific device. Other problems associated with point to point wiring include connecting multiple conductors, labeling each of these conductors, and associating each device with a physical location.

Some conventional systems, such as that described in U.S. Pat. No. 6,504,479 attempt to integrate an image based video security system, a burglar alarm system and an access control system to detect the presence of an intrusion onto a site. However, the control, sensor, video, audio, and bi-directional components in these systems do not operate over a common communications channel and are typically integrated through interfaces from each of the separate applications top level management software, rather than through direct interaction between the lower-level components. Control of these systems is directed from a central monitoring center. Newer systems use IP cameras that combine inputs, sound, and video over a common Real-time Transport Protocol (RTP) or Hypertext Transfer Protocol (HTTP) channel over a network.

It would, therefore, be desirable to provide a security system including distributed control, monitoring, audio and video devices operating over a common communications channel which facilitates the interoperability of the display monitors with remote cameras and other video sources. It would be further desirable to reduce the number of installation tasks and simplify the security system installation.

SUMMARY OF THE INVENTION

Embodiments described herein include a networked monitor appliance (NMA). The function of the networked monitor appliance is that of a monitor; that is, it replaces a conventional video monitor but the NMA is also an intelligent device and includes greater network addressability. The primary output interface for the NMA is a physical monitor. The monitor can be a conventional monitor, a window in an application, or a window on a mobile device. In a set-top box implementation, the NMA serves a display to an HDMI-capable monitor.

In one embodiment, a system to display video over a network includes at least one networked monitor appliance having a network interface coupled to the network, a local database coupled to the network interface adapted to receive predetermined resource information from at least one networked monitor controller, a command interface coupled to the network interface and the local database adapted to receive commands from the at least one networked monitor controller including registration data, at least one view and at least one video display request. The networked monitor appliance further includes a view scheduler coupled to the local database, a rules engine coupled to the view scheduler; video stream processor coupled to the view scheduler and adapted to receive at least one incoming video stream from at least one video stream source in response to the at least one video display request, at least one video display monitor coupled to the view scheduler and the view scheduler and the rules engine specify operation of the networked monitor appliance in processing the at least one incoming video stream and displaying corresponding video content.

With such an arrangement, the networked monitor appliance is able to display video content from a variety of sources over a common communications channel. Other features include an option to display digital signage (e.g., text, images) instead of video or when video is not displayed, dynamic video display reconfiguration to show priority video and rules which can be configured to show various common monitor applications such as self-view, quad view, etc.

In accordance with a further embodiment, the networked monitor appliance further includes a slave processor and a networked monitor appliance command interface, and the networked monitor appliance command interface includes an event engine coupled to the rules engine, the view scheduler and the video stream processor. The event engine can receive security events from at a global security control system, a local security control system, a networked monitor controller or a mobile application.

In other embodiments, incoming video streams can also originate from crowd sourced video, a video recorder, an IP camera and external video. A video stream can include a token to authenticate itself. In another embodiment, the networked monitor appliance includes a Human Machine Interface (HMI) coupled to the network interface.

In still another embodiment, the networked monitor appliance includes a predetermined default incoming video stream request processing rule. In yet another embodiment, the networked monitor controller includes: a security system, a digital video recorder (DVR), a forensic desktop or an access control system. In this embodiment, networked monitor controller further includes: a network interface coupled to the network, a view manager coupled to the network interface and a view builder coupled to the network interface.

In one embodiment, a technique to display video stream across a network includes configuring a network monitor appliance including naming the network monitor appliance, building a view for the named network monitor appliance, activating a view on the named network monitor appliance, receiving a video stream corresponding to the activated view, applying a set of rules to the video stream to determine a display priority and configuration, scheduling the video stream according to the set of rules and displaying the video stream as a view on at least one display monitor of the named network monitor appliance.

In another embodiment, activating a view further includes: receiving an event, processing the event and generating a video display request to the named network monitor appliance to activate the view. In another embodiment, the technique further includes canceling the activated view in response to resolving the event.

In yet another embodiment, activating a view further includes generating a video display request to the named network monitor appliance to activate the view in response to a command from a user interface. In another embodiment, the technique further includes locking the view for display. In another embodiment, the technique further includes deactivating the view in response to one of: receiving a command to deactivate the view, detecting an expiration of a view life timer, receiving a dismissal through a user interface of the named network monitor appliance and resolving an event which activated the view and receiving a deactivation command.

In still another embodiment, the technique further includes sharing the view on the network monitor appliance with second network monitor appliance. In another embodiment, the video stream includes a secure stream handle, source designator, start time, duration, and encoding method. In another embodiment, the secure video stream handle is a temporary, randomly generated, authentication token obtained through a secure process, and becomes invalid when one of: the video stream corresponding to the secure video steam handle is closed or an underlying connection is dropped.

In still another embodiment, the technique further includes sending an identity packet in response to receiving a source system identification configuration command from a networked monitor appliance controller. In still another embodiment, the technique further includes operating in a black screen configuration or a white screen configuration. In still another embodiment, the technique further includes: providing a user interface to user to drag and drop a plurality of icons representing a corresponding plurality of cameras onto the view, automatically arranging the video streams from the corresponding plurality of cameras in a plurality of windows and allowing a user to rearrange the video streams from the corresponding plurality of cameras in the plurality of windows. In other embodiment, the technique further includes: including location information, time stamp and authenticity data in the at least one video stream, generating a stream search request, displaying digital signage or displaying a plurality of steams in a carousel mode.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

It is to be understood that the features of the networked monitor appliance and networked monitor appliance controller can be embodied strictly as a software program, as software and hardware, or as hardware alone such as within a single processor or multiple processors, or within an operating system or within a software application. One embodiment includes a computer-readable non-transitory storage medium having instructions stored thereon for processing data information, such that the instructions, when carried out by a processing device, enable the processing device to perform operations of: configuring a network monitor appliance including naming the network monitor appliance, building a view for the named network monitor appliance, activating a view on the named network monitor appliance, receiving a video stream corresponding to the activated view, applying a set of rules to the video stream to determine a display priority and configuration and displaying the video stream as a view on at least one display monitor of the named network monitor appliance.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein

DETAILED DESCRIPTION OF THE INVENTION

A network monitor appliance (NMA) drives one or more video displays based upon text and video data delivered over the network. In embodiments described herein the NMA operates as a named, network-available appliance that drives a video display based upon text and video data delivered over the network from one or more known sources or other external sources.

Figure 1:
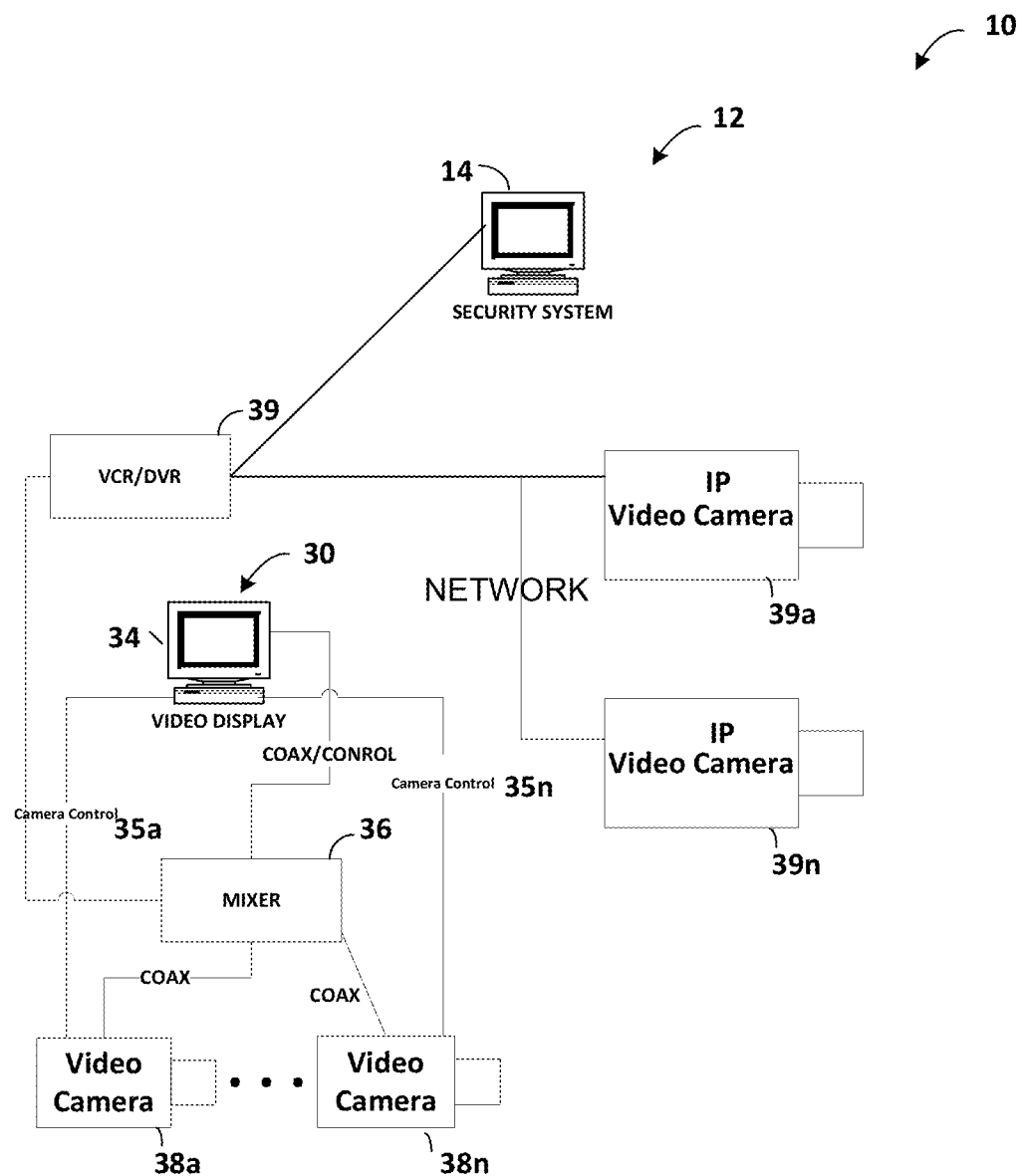
FIG. 1 is a block diagram of a prior art video surveillance system.
Figure 2:
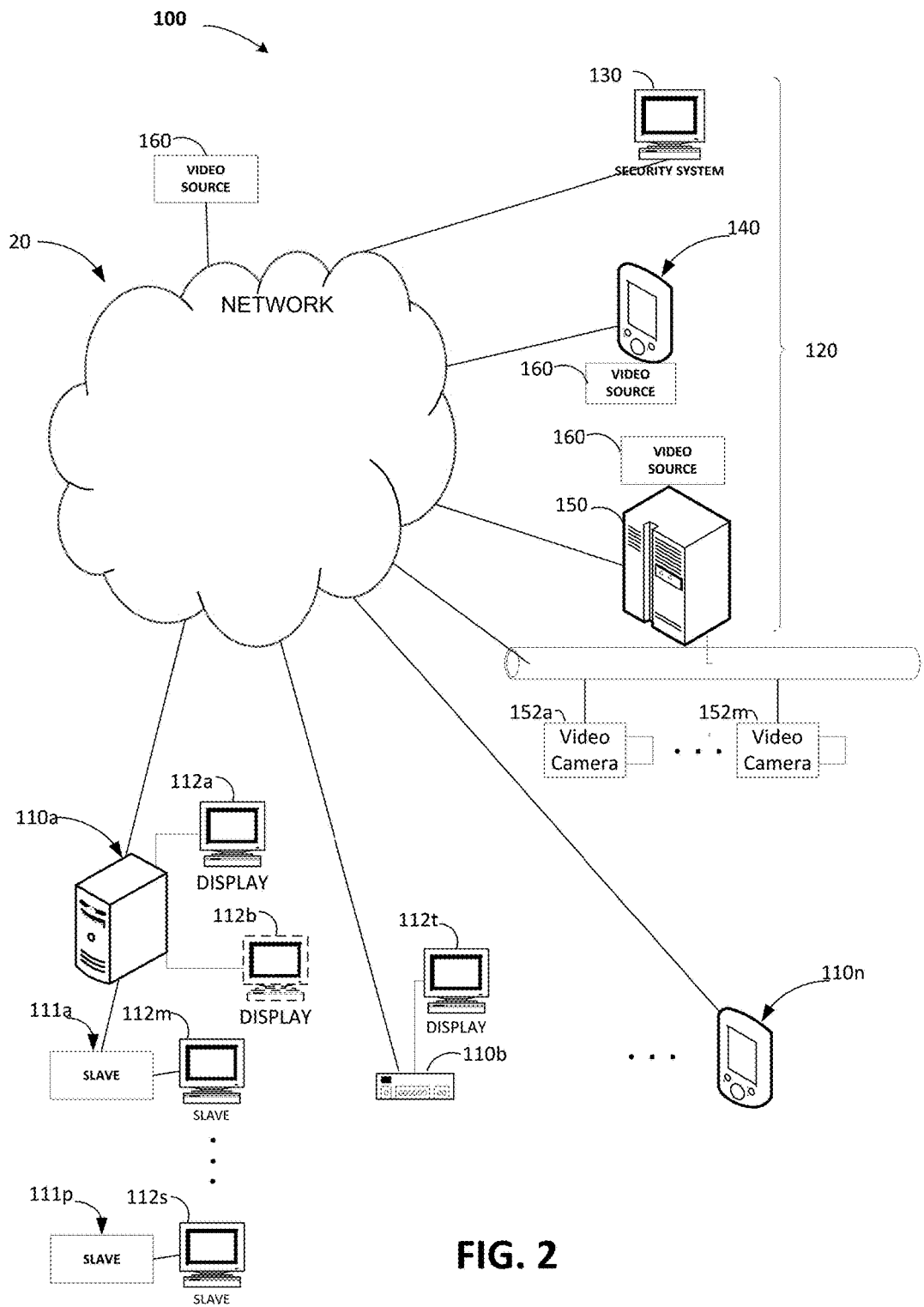
FIG. 2 is a schematic block diagram of an integrated security system including networked monitor appliances and networked monitor controllers according to the invention.

Now referring to FIG. 2, an exemplary system 100 to display video over a network 20 includes networked monitor controllers 120 and networked monitor appliances 110a-110n (generally referred to as NMA 110). The NMA controller 120 includes, but is not limited to, a global or local security system 130, a mobile device 140 (with or without a camera) running a mobile application, a forensic desktop system (not shown) and a digital video recording system (DVR) 150 which can be directly hard wired to cameras or controlling cameras over a network. In one embodiment, the security system is an S2 Netbox® and the DVR 150 is an S2 NETVR provided by S2 Security Corp. The DVR 150 and mobile device 140 can be both an NMA controller 120 and a video source 160. The NMA 110 includes, but is not limited to, a personal computer, a set-top box and a mobile device. The NMA 110 can be connected to a display monitor 112 and optionally more than one display (e.g., display monitor 112b). The NMA 110 generally maintains a rectangular bitmap display on the display monitor 112. In one embodiment, the NMA 110 includes a client app for use on a personal computer (PC) including one or more separate displays 112a-112b. In another embodiment, the NMA 110 is available as an NMA application on a dedicated set-top box with one or more displays. In still another embodiment, the NMA 110 is available as an app running on a mobile device operating system (e.g., iOS or Android) with an integrated display. There is generally no uniform display size for an NMA 110. In one embodiment, the NMA 110 determines the placement, scaling, etc. of video in the display real estate it controls. The system 100 further includes slaved NMAs (SNMAs) 111a-111p which are generally controlled by a local NMA 110a. Networked monitor appliances can be slaved, that is, made a slave (SNMA) of a master NMA (MNMA). Slave monitors do not require a user input interface are controlled from a master. SMNA functions include: duplicating the master's image (i.e., the same data stream that the MNMA has is displayed on the slave(s)). Slaves are kept in sync with the master by means of periodic automatically determined bandwidth adjustments so that the physical placement of the NMA 110 is irrelevant (i.e., it displays something reasonable given its available resources) and mapping the master's canvas (i.e., allow the master to have a canvas that extends to another NMA 110, as in the creation of a video wall).

NMAs 110 can run on several platforms, and can share a platform with another system (e.g., DVR 150 or mobile device 140). Shared device NMAs 110 running on the same physical hardware as the DVR system can either be registered as private, in which case only the source system can use it, or as public. The system 100 can also include other video sources 160 (e.g., crowd sourced video, external video or an IP camera). Video streams which are provided to the NMAs 110 can either be prerecorded or live streams. In one embodiment, legacy video systems can be supported through a software adaptor or an applicant programming interface (API).

In operation, networked monitor appliances are named entities that share a common API across implementations. NMAs 110 are receivers of video streams, events and configuration data; the sources of video streams and events are digital video recorder (DVR) enabled systems, network-connected cameras and security system components. In one embodiment, events are generated by security system applications that adhere to a standard event model.

The NMA 110 includes two display modes: configure mode and surveillance mode. Configure mode is for specifying the operation of the NMA 110, registering systems including video source, and receiving programming rules including view display rules. Surveillance mode is the primary operating mode of the NMA 110 in which the NMA 110 is a real time information display.

Surveillance mode describes when a user wants to monitor an automatic view. There are two ways to monitor in this mode, either "white screen configuration" or "black screen configuration". In white screen monitoring, the user is interested in only an assigned view. In black screen monitoring, a default view is set, but the view is responsive to incoming display requests.

Views are the basic program unit of a NMA 110. Video content is displayed on a NMA 110 from within a view. A view specifies a set of objects, a layout for the objects and rules to apply to rendering at runtime. Views are transportable to other applications. Views are uniquely identified and carry versioning data so that it is possible to determine staleness. Views can be edited and can be optionally locked by the original author. Views can also include author, date of creation, editing history, system creation and version information. In configure mode, the user can build named views by adding cameras and text streams to a view. The appearance of the view can be selected from a view pallet or can default to a predetermined auto mode. As the cameras are added to a view in view auto mode, the NMA 110 decides what grid structure to use to display them based on the number and type of elements in the view. As cameras are added, the grid dynamically repaints and allows the user to move cameras within the grid. Similarly, when text streams are added to a view, they can be dynamically moved on the display as the NMA 110 needs to accommodate other data outputs.

Once a view is constructed, it can be stored as a named entity, and recalled at a later time. The view is an object that can be stored on the NMA 110 or on a source system. The NMA API permits invoking a view from memory or displaying one that is passed to it. In one embodiment, the NMA API resides on the client side. This allows views to be transportable objects that include enough information to allow display of video with no additional overhead. For example, if someone sends an a view in an email, the recipient can display the view on their NMA 110 and the view will be the same on the sender's NMA. Among the view's additional properties are its name, priority, and other metadata as required to support advanced capabilities.

The NMA 110 generally runs in surveillance mode. In surveillance mode, the NMA 110 can be set up as "black screen" or "white screen." In white screen monitoring, an assigned view is displayed on the monitor. This is the majority of surveillance cases: the user wants a particular view or set of rotating views to appear on a particular monitor. In black screen configuration, the user wants a default data display, or nothing to display on the monitor unless something requires his attention, and then to change to it either automatically or in response to a command from a registered system. The black screen configuration is responsive to the demands of incoming display requests, adjusting to accommodate them as needed. White screen designs have the advantage that they look the same whereas black screen designs have the advantage that they respond directly to the demands of system monitoring.

Surveillance applications include displaying a view or carousel of views on a Networked Monitor Appliance as a default operation. In another application, a view or carousel of views is slaved across a number of networked monitor appliances. One or more Networked monitor appliances run at various locations in conjunctions with a security operations center (SOC) with a local security control system or global security operations center (GSOC) with a global security control system, and assigned an alarm monitoring black screen function. The Networked monitor appliance application can also run on a Forensic Desktop. Video for the highest priority outstanding alarms displays on the NMA 110. In one embodiment, an NMA 110 on a security supervisor's desk displays a preconfigured view. Occasionally, a security officer in the field or in the SOC commands a video stream to be displayed on a supervisor's NMA 110. An NMA 110 can be configured to display live camera video in a view-only application (e.g., self-view, multiple monitoring stations that show a preconfigured view in a SOC or GSOC, etc.).

The following are examples of the operation of an NMA. In a first example a guard is viewing a three cell by three cell view on the NMA 110. A security officer (SO) sends a guard a view with a video stream of a suspect showing in a main display layout cell (DLC). Other streams currently displayed are relocated according to priority. The lowest priority stream is removed or two lowest priority streams may alternate in a carousel mode.

In a second example, a SO at college campus in out the field and notices something strange. SO uses his iPad running a Mobile Security Officer® (MSO) application to stream video back to the command center. This video is then displayed on to the NMA 110 in the command center. Users are viewing the display of the NMA 110 in Surveillance Mode and watching several video streams of a demonstration on the main campus quad. A new stream request from an on-site SO comes in and the user accepts that stream. A second stream request from an off-site facility comes in and the user rejects that request. Finally, a stream request of a possible break-in event is automatically accepted.

In a third example similar to the second example, but user is running the NMA 110 in an automatic mode. When each new stream request from the on-site SO comes in, the NMA 110 automatically accepts it and processes it according to the predefined rules and configuration and schedules it for display. Note that whether the stream actually appears or not and in which cell is dependent on the current streams being viewed and the rules and configuration.

In a fourth example, the NMA 110 is setup in front of corporate entrance with one by one layout with video showing customers, employees, and visitors as they enter (i.e., a self-view). A fire alarm in the building goes off which triggers a Security System 130 event. The NMA 110 receives a request to reconfigure the NMA 110 with a three by three cell layout with each video showing key points in the building to be viewed, for example, by a fire department. The fire department arrives, investigates, and clears the alarm. The NMA 110 then reverts to the one by one self-view. In a fifth example, the SOC is setup with several NMAs 110 showing black screens (i.e., no activity). A fire alarm in boiler rooms goes off that triggers a Security System 130 event. The NMA 110 receives a request to display a two by two layout display of the boiler room. Once the event is cleared, the NMAs 110 go back to black screens.

Figure 3:
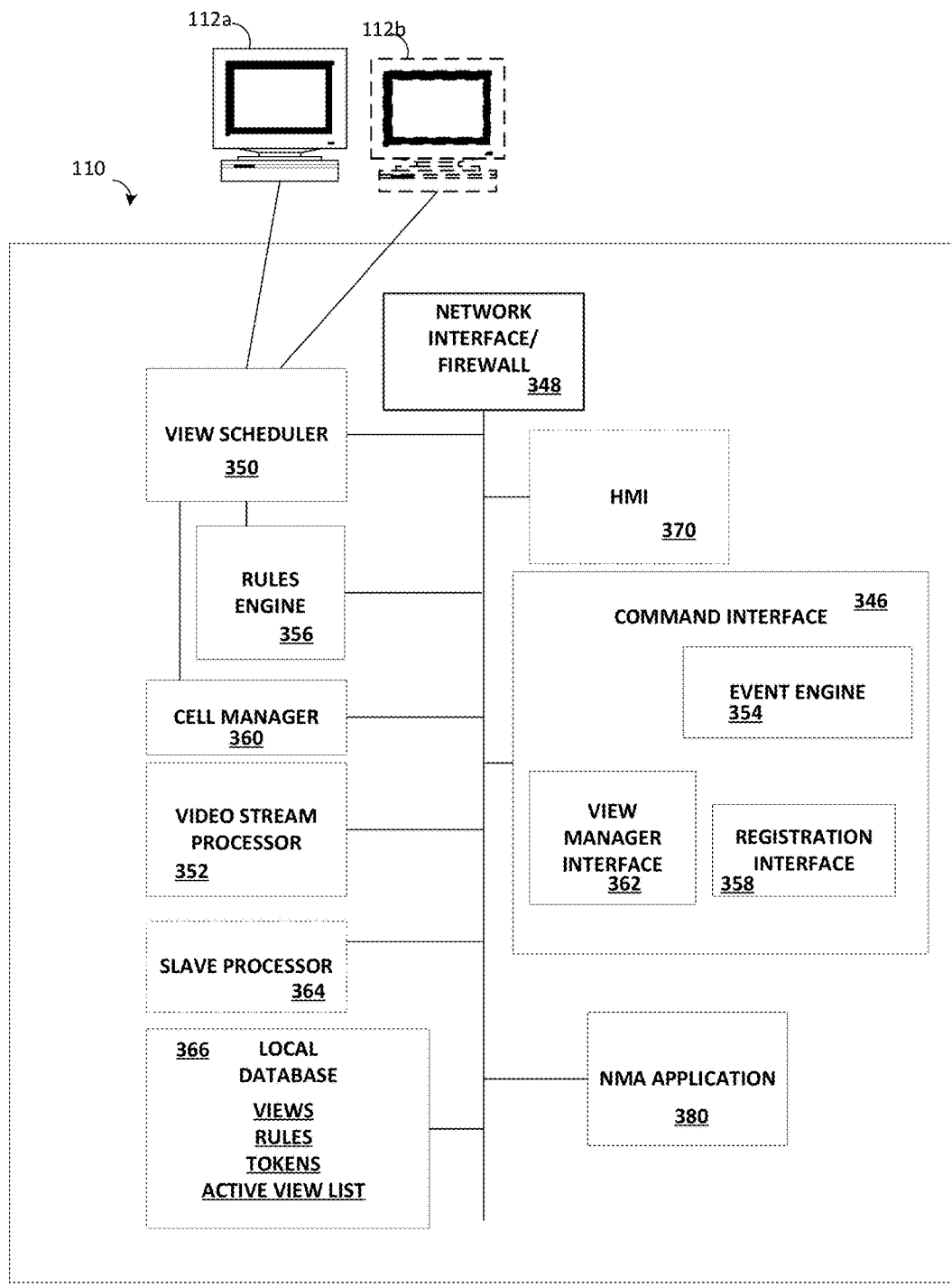
FIG. 3 is a block diagram of a networked monitor appliance of FIG. 2.

Now referring to FIG. 3, an exemplary NMA 110 includes a network interface 348 coupled to the network 10, a local database 366 coupled to the network interface 348, a networked monitor appliance command interface 346 coupled to the network interface 348 and the local database 366, a video stream processor 352 coupled to the network interface 348, a view scheduler 350, at least one video display monitor 112 coupled to the video stream processor 352 and a rules engine 356 and a cell manager 360 coupled to the video stream processor 352 and the local database 366. The rules engine 356 includes at least one predetermined default incoming video stream request processing rule. The NMA 110 further includes an NMA Application 380 which includes a graphical user interface describe below in conjunction with FIGS. 7-11. The NMA 110 optionally includes a human machine interface (HMI) 370, additional display monitors 112b and in certain configurations a slave processor 364. In one embodiment, the NMA 110 has an HMI 370 which includes a keyboard and/or a touch screen, mouse, or other pointer device. In other embodiments, there is no input device, or that the input will be via a pointer device only.

In operation, the local database 366 receives predetermined resource information from at least one networked monitor appliance controller 120 and store views rules and tokens for secure communication and authentication. The command interface receives commands from the networked monitor appliance controllers 120 and video sources 160, and these commands include registration data, views and video display requests. Networked monitor appliances 110 and the video sources 160 co-register. NMA controllers 120 and video sources 160 direct commands and data to designated NMAs 110. NMAs 110 decide what to display based on rules that rely on metadata they receive from the video sources 160 and NMA controllers 120. The view scheduler 350 drives the displays of views in conjunction with the rules engine 356 and the cell manager 360. It is responsible for determining where to display content in cells of a layout when events or direct control commands are received from a remote system.

The video stream processor 352 receives incoming video streams from video sources 160 in response to video display requests. A video stream can include location information, time stamp and authenticity data. The rules engine 356 specifies the operation of the networked monitor appliance 110 in processing incoming video streams and displaying corresponding video content on one or more monitors 112. The cell manager 360 determines how a display layout cell (DLC) works within a display layout view (DLV). Together with the view scheduler 350, the cell manager 360 determines which display object (DO) is included within a DLC as well as time to live of the DO. The view scheduler 350 also determines how a guard tour will carousel (i.e., rotate) between different DOs.

In one embodiment, the NMA 110, NMA controllers 120 and sources of video streams use a cloud-based registry to facilitate discovery and authentication. In another embodiment, a user connects the NMA controllers 120 to an NMA 110 using an IP address or Domain Name System (DNS) name of the NMA 110. Events can trigger an NMA 110 to display a certain view or can push a stream to the NMA 110 and the NMA 110 view scheduler 350 in conjunction with the rules engine 356 will add the stream to the current view and possibly display the stream. Events can be sent from a user command keyboard on the HMI 370, a command from the security system 130, a mobile device or a Mobile Security Officer® application, as supplied by S2 Security Corporation, Framingham Mass.

Figure 4:
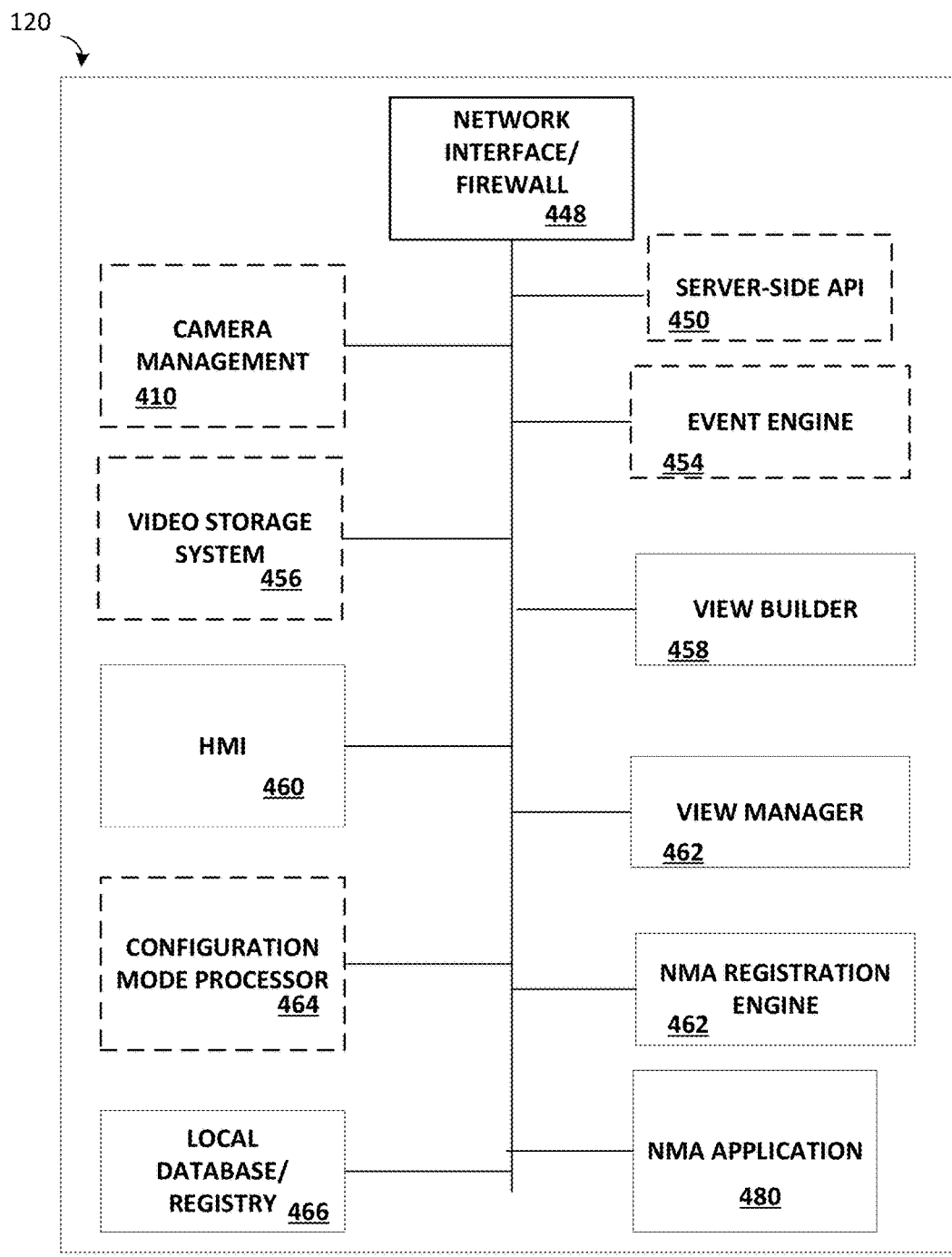
FIG. 4 is a block diagram of a networked monitor controller of FIG. 2.

Now referring to FIG. 4, an exemplary NMA controller 120 includes a network interface 448, a view manager 462 coupled to the network interface 448, an HMI 460, a local database/registry 466, an NMA 110 registration engine 463 and a view builder 458 coupled to the network interface 448. The NMA controller 120 optionally includes a server-side API 450, a configuration mode processor 464 and an event engine 454. Configuration mode is used when a user wants to build a view. In this mode the user will also be able to register systems and create programming rules, specifying the operations of the MM. When the NMA controller 120 is configured as a DVR 150 it can also include camera management 410 and a video storage system 456. The NMA controller 120 also runs an NMA application 480 similar to NMA application 380. The NMA application 480 generally runs in configuration mode.

Certain features of the system 100 are facilitated by the server-side API 450. The server-side API 450 supports a stream search request (e.g., a request to locate a stream given a Coordinated Universal Time (UTC) time specification, and a media source designator or metadata). The server-side API 450 responds with a video stream handle if the search is successful. Metadata items which can be used in a search include: IP address of the source and the MAC address of the source, geo-location (e.g., latitude and longitude) for the source and the type of camera (e.g., manufacturer, SKU, etc.). Video stream searches can supply a UTC time specification, and optionally supply one or more other parameters. The result from the search is one or more stream handles. For example, a user performs a stream search for a given IP address using LIVE as the time, and the server would provide a stream handle for a live stream. Alternatively, a user performs a stream search for a given UTC time specification and the server returns an array of stream handles for whatever recorded video streams the server has recorder. The video stream handles are processed internally by the NMAs 110 and the NMA controllers 120.

In operation, on a NMA controller 120 desktop, a user logs into the NMA controller 120, installs the NMA Application 480 (if not already available, starts the NMA application 480, and then can proceed to build views and manage remote NMAs 110.

Figure 5:
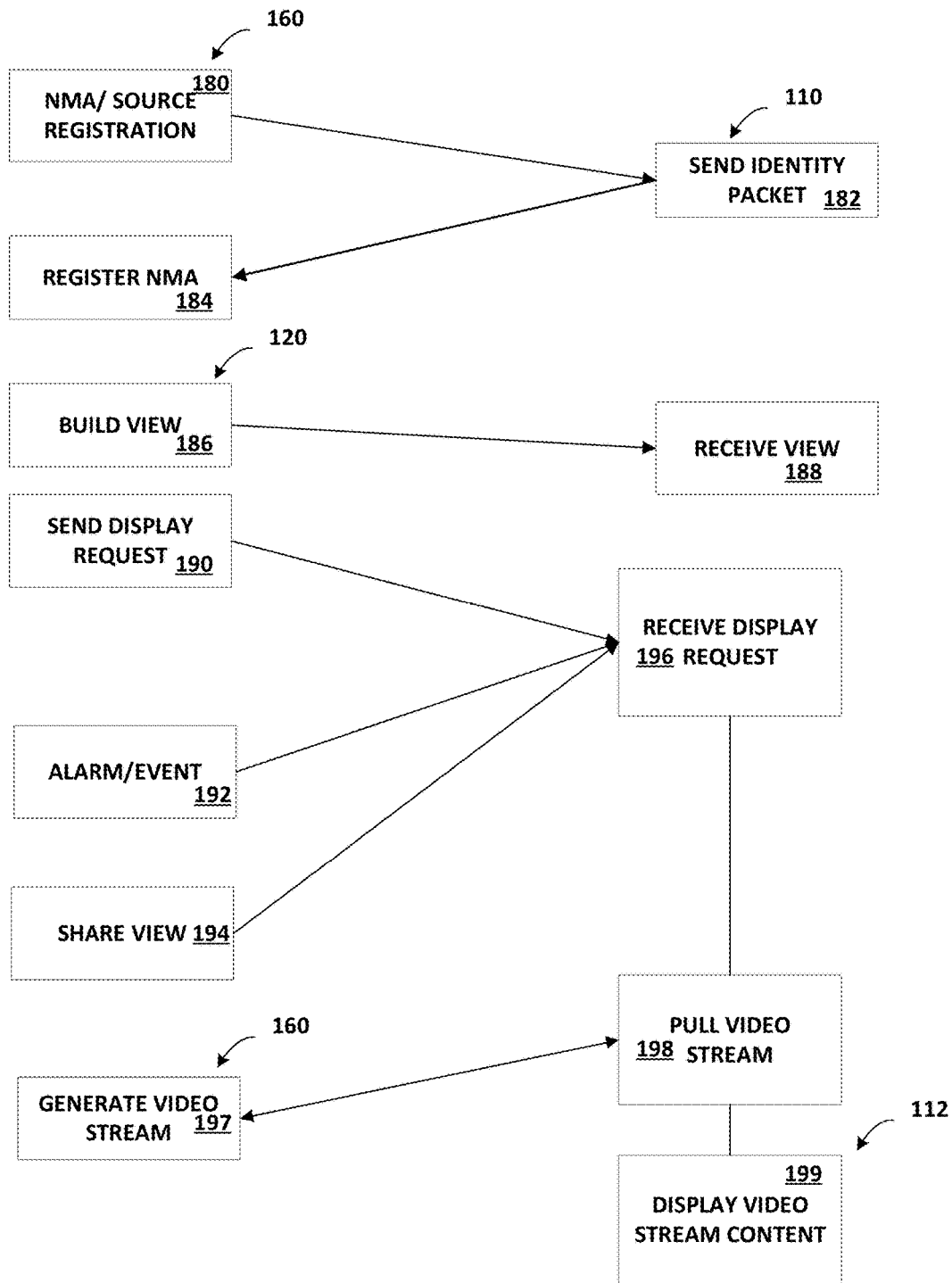
FIG. 5 is a data flow diagram of the system of FIG. 2.

Now referring to FIG. 5, a data flow diagram illustrates communications among an NMA controller 120, video sources 160 and an NMA 110 including configuration and streaming of video. In one embodiment, the NMA controller 120 has an IP address for the NMA 110 and sends a NMA/Source registration request/source system identification configuration command 180 to the NMA 110. In response the NMA 110 send an identity packet 182 back to the requesting NMA controller 120 which proceeds to register the NMA 110. It is understood that a single NMA controller 120 can register the NMAs 110 in a system or the NMAs 110 can be registered by several multiple NMA controllers 120 and the registration information can be included in a distributed synchronized database. During completion of the registration process, the NMA 110 can be assigned a name and receive security tokens and certificates so that it can be securely addressed and authenticated by NMA controllers 120 and video sources 160 in the network.

A user creates a view 186 on a NMA controller and deploys the view to the NMA 110 view 188. The view is activated when the NMA 110 receives a display request 196. The display request 196 can be a display request 190 sent from a NMA controller 120 or locally generated at an NMA 110 with an HMI 170 and user interface, an alarm or event 192 converted into a display request or a share view command 194. In one embodiment, a view activation request is issued to queue a specific view at a given NMA 110. This request also carries a system-wide priority that the NMA 110 can use to arbitrate competing demands for space on the display areas of attached monitor(s) 112. Because the activation request lives indefinitely at the NMA 110, the requestor either explicitly takes down the request, allows a user to dismiss it, or provides a lifetime for the view display request (e.g., "delete this request if not satisfied within nn seconds"). A view can be deactivated with a deactivation command. In one embodiment an event is unified across the network of NMAs 110 and NMA controllers 120 such that an NMA 110 aggregates and displays event logs in real time. In one embodiment, the NMA 110 includes a monitoring display that can display activity logs from NMA controller 120 (e.g., the global or the local security control system 130) on the same display as the video.

After receiving the display request 196 the NMA 110 contacts the video source 160 to generate a video stream 197 and pulls the corresponding video stream 198. The video stream content is displayed 199 on the display monitor(s) 112. Video streams are uniquely identified media sequences. Characteristics of a stream include: a handle, a media source designator, a secure stream handle, a start time and duration, a display priority and an encoding method. The video stream handle identifies the stream, and is known to readers and the writer of the video stream. The video stream handle can be a secure video stream handle using a temporary authentication token. Video stream handles are temporary entities that represent a live connection between client and server, and they become invalid when the stream is closed or the underlying connection it is dropped. Video stream handles are obtained through a secure process, and each is randomly generated.

Media source designators uniquely identify media producers such as cameras. The identification is generated by the NMA controller 120 and includes enough information to uniquely specify a media stream. Media source designators are used wherever the client and server need to communicate involving a media producer. The start time and duration specify either a UTC date/time and stop time, or the "LIVE" indicator, when requesting a live stream. The encoding method includes MJPEG, H.264 or such other encoding as may be available on the server and known to the client.

In one embodiment, an exemplary View Data Structure includes the following:
 A layout (e.g., one by one, two by two);
 Reference to layout file
 Mapping of cell to priority or label (e.g., "a, b, c, d, e" mapping); and
 Is ThereAnyActivityLog flag.
For each cell in layout the View Data Structure includes:
 Default camera (Can be NULL or empty);
 Label, e.g., a, b, c, d;
 Is TheCellLocked flag;
 Queue size (e.g., 0, 1, 2, 3, 4); and
 Other attributes, (e.g., image to display or text to display)

Figure 6:
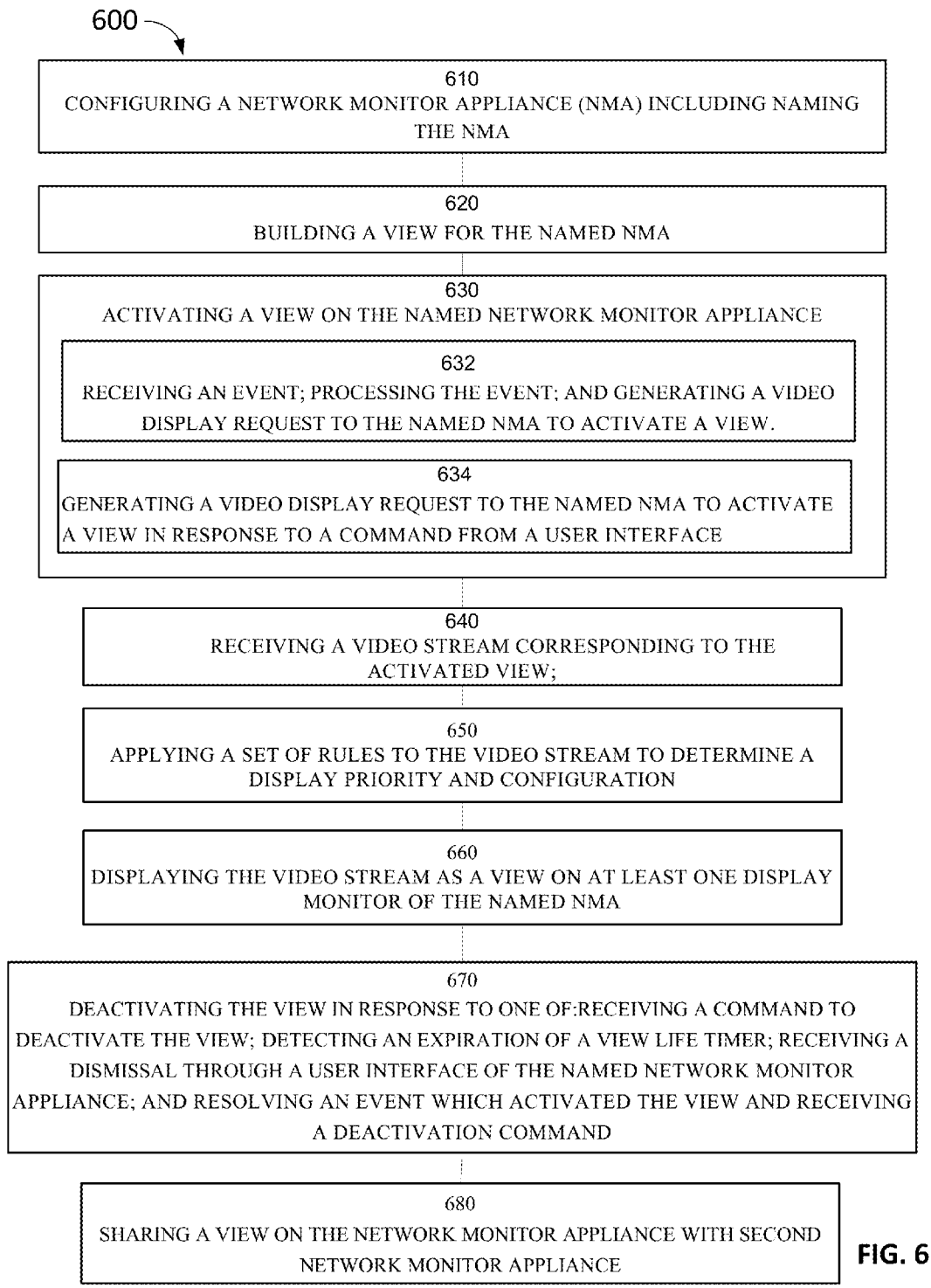
FIG. 6 is a flow diagram illustrating the steps to process a video stream from an external source and displayed by the networked monitor appliance of FIG. 2.

Turning now to FIG. 6 in which like reference numbers refer to like elements of FIGS. 2, 3, and 4, a flow diagram illustrates a process for displaying video over a network. In the flow diagram of FIG. 6 the rectangular elements are herein denoted "processing blocks" (typified by element 610 in FIG. 6) and represent computer software instructions or groups of instructions. The diamond shaped elements in the flow diagrams are herein denoted "decision blocks" and represent computer software instructions or groups of instructions which affect the operation of the processing blocks, Alternatively, the processing blocks represent steps performed by functionally equivalent circuits such as a digital signal processor circuit or an application specific integrated circuit (ASIC). It will be appreciated by those of ordinary skill in the art that some of the steps described in the flow diagrams may be implemented via computer software while others may be implemented in a different manner (e.g. via an empirical procedure). The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention.

As described below, steps 610, 620 and 630 generally occur on the NMA controller 120 and steps 640, 650, 660 occur on the NMA 110. The process commences in step 610, a network monitor appliance is configured including naming the network monitor appliance. The NMA 110 exposes a registration interface that source systems use. The NMA 110, NMA controller 120 or the video source 160 can initiate registration, and once registered, the NMA 110 or video source registration persists until it is un-registered or the registration expires. Registrants can request expiring or permanent registrations. Expiring registrations are useful when the NMA 110 is being used to display video from an infrequently connected video source. The video source identifies itself and the cameras it controls, and in turn receives an identity packet from the NMA 110. The NMA 110 identifies itself in an identity packet which provides sufficient information to create a communication session in an efficient and secure manner (i.e., without reopening the network connection every time. Tokens are exchanged between the video source 160 and the NMA 110 to secure communications. The ability exists for the NMA 110 to communicate securely with its data sources. The video sources 160 are often close to the NMA 110, but not always so. The NMA 110 adapts to a bandwidth budget, using rules where necessary to translate a stream. Multiple sources, possibly connected to disparate networks, can be registered to a single NMA 110. The NMA 110 is responsible for managing the display access priority when there is competition for screen display resources. The NMA 110 can be the target of many systems (e.g., NMA controllers 120 in the field, each asking to display something on the display screen. The display screen is a limited spatial resource, so rules in the NMA 110 exist to allow the NMA 110 to prioritize handling requests. Depending on configuration, these rules include growing the number of display cells, carouseling multiple streams in a cell and using stream priority to determine which streams are displayed.

Authentication can be required for a NMA 110 to be controlled either locally or remotely. A user may wish to control the NMA 110, in which case a username and password login dialog will be presented allowing access to the local system. Another scenario is when a security system 130 wants to control the NMA 110 remotely, thus a username and password will be sent in the remote call in order for the control command to be permitted. In this case, the access credentials will be encrypted when being sent over a network. In one embodiment, discovery techniques are used in the process of a security system 130 to know when a NMA 110 exists in the world. When a NMA 110 is turned on and the system is ready, it will announce to systems in a registry list. The registry list will be pre-defined but it will also be possible to dynamically add a new system to the registry list via some configuration tool. Once a system has received an announcement from a NMA 110, keep-alive techniques (e.g., a ping, ICMP echo request) are used to confirm the availability of the system. If a keep-alive transmission results in no response, the security system 130 will assume the NMA 110 has gone offline.

In another embodiment, it is possible to force registration of a NMA 110 on a security system 130 without discovery by manually entering the IP addresses. For local access to the MM, a Login Manager in the registration interface 358 will be responsible for presenting the user with a login dialog and authenticating the user, this giving access to the NMA 110 to control via a mouse & keyboard. The login manager is responsible for keeping track of the local usernames and encrypted passwords.

In step 620, a view is built for the named network monitor appliance. In one embodiment, the NMA controller 120 provides a "view builder" user interface that allows the user to build view which are dynamically auto-configured and previewed for the user. In one embodiment, the NMA 120 can copy views created from one NMA 110 to another. The view builder permits the user to drag and drop icons representing cameras onto the view, and have the NMA 110 suggest an arrangement automatically. A view can be configured on a NMA 110 or the NMA controller 120. The user can then rearrange the cameras if desired. In one embodiment, the NMA 110 arranges the display of content from video sources 160 into conventional arrangements (e.g., 2×2, quad, 3×3, 1+7, etc.). Display arrangements can be automatically determined by the NMA 110 or overridden by user-selected arrangements. Views include a layout, rules, and the cells of the layout. Cells include a set of parameters, for example, whether the cells carousel or remain fixed, minimum priority, and can include a queue for queuing video streams or other cell content. The NMA 110 performs layout management to display layout view (DLV). In conjunction with the view scheduler 350, the rules engine and video stream processor an overall view is displayed. When a user changes to a different DLV, the NMA 110 creates a new DLV for display.

In one embodiment, the view manager interface 362 is a software graphical user interface (GUI) for assigning views to known NMAs 110 under user control. The GUI from an NMA controller 120 provides a grid-oriented technique to assign views to NMAs 110, and program various settings. In one embodiment, the NMA 110 supports an adaptive layout facility where it displays the video requests it receives, automatically adjusting the display layout to accommodate as many requests as possible.

In step 630 a view is activated on the named network monitor appliance. A view can be activated in several ways. In step 632, a view is activated by receiving an event, processing the event and generating a video display request to the named network monitor appliance. In step 634, a video display request is generated (e.g., and sent to a named network monitor appliance to activate a view in response to a command from a user interface on an NMA controller. NMAs 110 can be configured to have a default view that displays on startup and thereafter when nothing else is demanding display space. Apart from the default view, there are several other ways the NMA 110 can activate a view. A view can be activated as the result of an event in one of several components in a security system, for example, an access control event, a motion detection event, and a request by a user to display video on a named NMA 110 while the user is viewing a video stream.

A "share to NMA" command from a GSOC generated by a SOC operator or from and a mobile device 140 operating as an NMA controller 120 shares a view with other users in the SOC. Each of these circumstances produces a view activation and corresponding display request. Given that there may be pending higher priority display requests, the NMA 110 determines when to actually display the view based on the availability of the display, and determined by the priorities of outstanding and newly arriving requests. View activation display requests include the name of the view, the NMA 110 on which to display the view, the priority to give the view, and the disposition method for the view which determines whether the view closes after some event and if so, whether anything particular action happens after the view closes. The priority is optional, and if not provided, the system default priority is assumed.

In one embodiment, an event action is added to the security system that instructs a named NMA 110 to display a named view with an optional priority. The NMA 110 receives request to activate the named view, and determine whether to immediately display to corresponding content taking into consideration the state of the NMA 110 and the priority of the incoming request. When the event resolves, the view request to the NMA 110 is cancelled and the display is taken down.

In step 640, a video stream corresponding to the activated view is received on the named NMA 110. A view can support multiple streams. The NMA 110 in a set top box embodiment, produces a video stream over HDMI to feed a display. Generally, for bandwidth limitations, the video stream is pulled by the NMA 110 from the video source. In step 650, a set of rules is applied to the video stream to determine a display priority and configuration for the display. The source supplies a priority for the stream and the NMA 110 can have a priority adjustment for requests from that source. The video stream is displayed as a view on at least one display monitor of the named network monitor appliance. Rules on the NMA 110 determine how to display multiple data sources when multiple stream-display requests are received. A limited user interface is supported by NMA 110 that permits some viewer functions directed at a selected view, plus convenience commands Examples include repositioning video streams on the display, PTZ-type camera telemetry, preset selection, and the like as well as commands directed at the NMA 110 as a whole. In one embodiment, the NMA 110 can be configured to prompt whether to accept the incoming request.

In general, the NMA 110 tries to display content in an intelligent way: for example, it scales windows, and avoids truncating visuals. How much can be viewed at any instant depends upon the size of the available display, and the NMA's 110 layout. A mobile device 140 might not be able to scale a large view down, and a large monitor might be able to display multiple views at once. Rules on the NMA 110 influence how it behaves in the face of incoming requests to display content. Rules handle the following exemplary situations:

determining display priority by priority supplied by requestor vs. chronological priority (most recent request)—this is used in determining the "most important" view;

permitting the user to dismiss a view through the user interface if the view was declared user-dismissible when it was activated;

when to display one view at a time regardless of available display real estate;

allowing the user to pick which view to display from a list of active views;

locking a view such that the NMA 110 will not respond to display commands until unlocked (this would be used when the NMA 110 displays a fixed, permanent view);

displaying a default view when there is nothing else to display or displaying a black screen;

permitting the user to move streams around within a view arrangement; and displaying active views as a carousel on the NMA 110.

A displayed view can be removed in response to several commands, security events or timers. In step 670, a view is deactivated in response to one of receiving a command to deactivate the view, detecting the expiration of a view life timer or receiving a dismissal through a user interface of the named network monitor appliance. Views remain active until they are deactivated. Deactivation occurs when: a command to the NMA 110 explicitly deactivates the view, the view life timer, if provided, expires, the view is dismissed through the GUI of the NMA 110 (provided that the user dismissal rule is active on the NMA 110 and the view was declared dismissible at activation) and the underlying event that caused the view to be instantiated becomes resolved. The NMA 110 maintains an active view list, and a user interface command is available that permits the user to select a view to display. After deactivation, the view is removed from the active view list.

In step 680, a view on the network monitor appliance is shared with second network monitor appliance. This feature allows, for example, a master network monitor appliance (MNMA) 110*a* to share a view with a slave network monitor appliance (SNMA) 111*a* so that the attached monitors display similar content. Additionally a view could be sent to a mobile device based on an alarm. A view on one NMA 110 can be shared with another NMA 110 using the "share to NMA" command. This command is typically used for collaboration from a user at a remote or mobile device. The share to NMA command is also used inside a SOC for certain events.

Figure 7A:
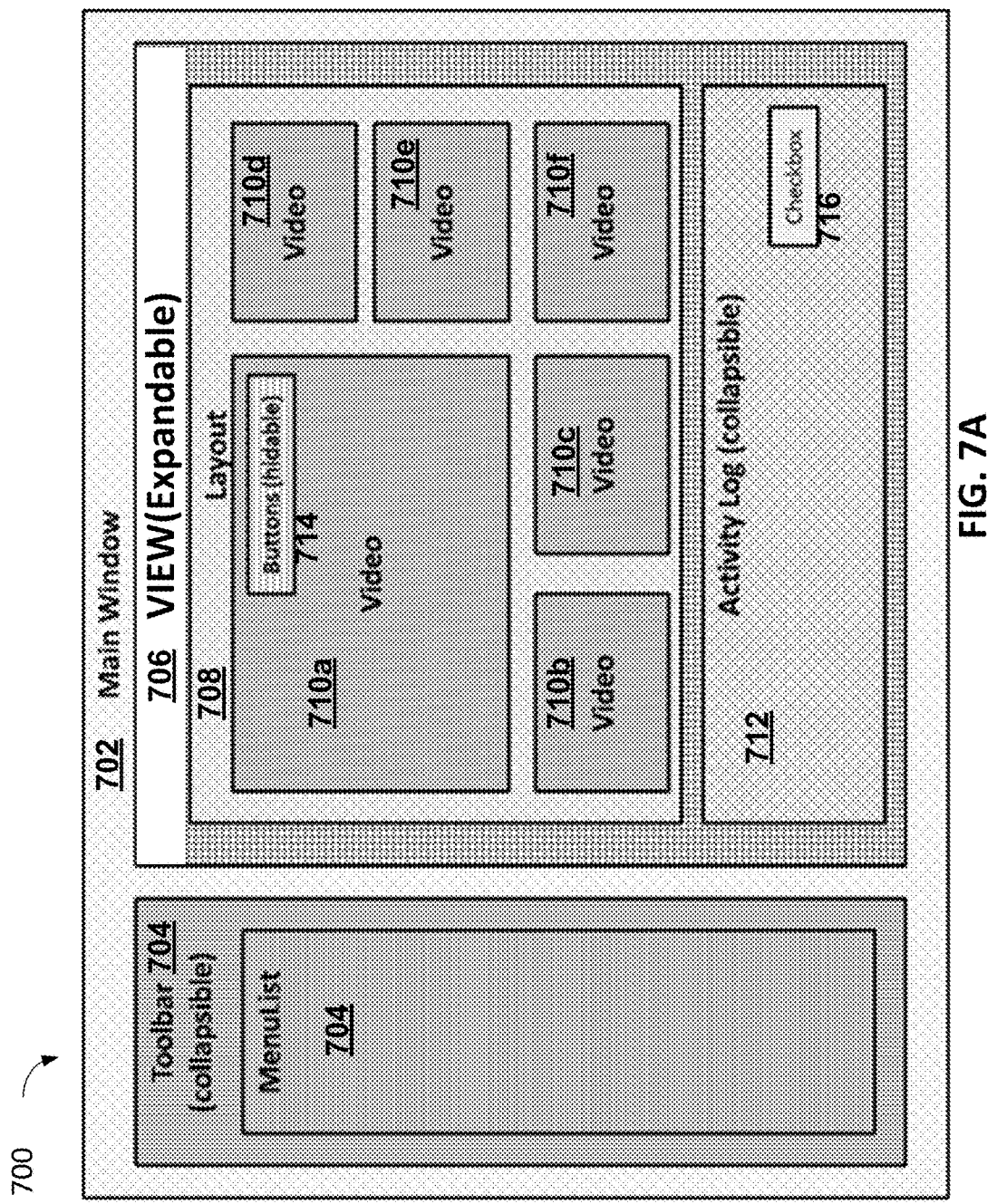
FIG. 7A is a block diagram of an exemplary screen display of the networked monitor appliance of FIG. 2.

FIG. 7A is a block diagram of an exemplary screen 700 of the NMA 110 of FIG. 2. Most content is displayed within a main window 702 including a Toolbar 704, a view 706 which includes a specified grid display layout 708 of display objects (DO) within individual display layout cells (DLC) 710*a*-710*f* (commonly referred to as DLCs 710 or cells 710). The DLCs 710 can include hideable buttons 714 for video stream control. The view 706 may also include an activity log 712 which can include a checkbox 716 for noting specific activities. Multiple views can be defined and stored as named entities and recalled at a later time. Among the view's 706 properties are its name, author, priority, and optional metadata. In one embodiment, cell 710 level configuration parameters include:

Stream possibilities (either default stream, locked stream, or no stream, where default streams are never removed from queue even though they effectively have the lowest priority;

Queue depth (priority queue)

0, 1 implies locked, 2, 3, 4, . . . size of queue (default 5);

Can be directly addressed;

Is in carousel (tour) mode;

Label (Pick of a, b, c, d, etc. up to number of cells in layout.

Image

Default (null);

Static image to display instead of video;

Text

Default (null);

Html text snippet.

In view 706, streams are displayed in a particular cell:

By configuration, for example, as a default stream as part of an automatic view or as a locked stream in cell as part of a automatic view;

As a result of an incoming stream request which directly addresses a stream into particular cell;

By auto placement into the cell in response to processing a rule by the rules engine;

In view 706, streams are removed by the view scheduler 350 in conjunction with the rules engine 356 by at least one of the following operations:

An underlying event gets acknowledged;

The security system 130 sends an ExpireStream message;

A time to live (TTL) parameter expires;

The NMA 110 automatically removes the stream; and

A stream gets bumped by a higher priority stream. It is noted that a stream may still be in queue, but it does not have to be displayed.

Figure 7B:
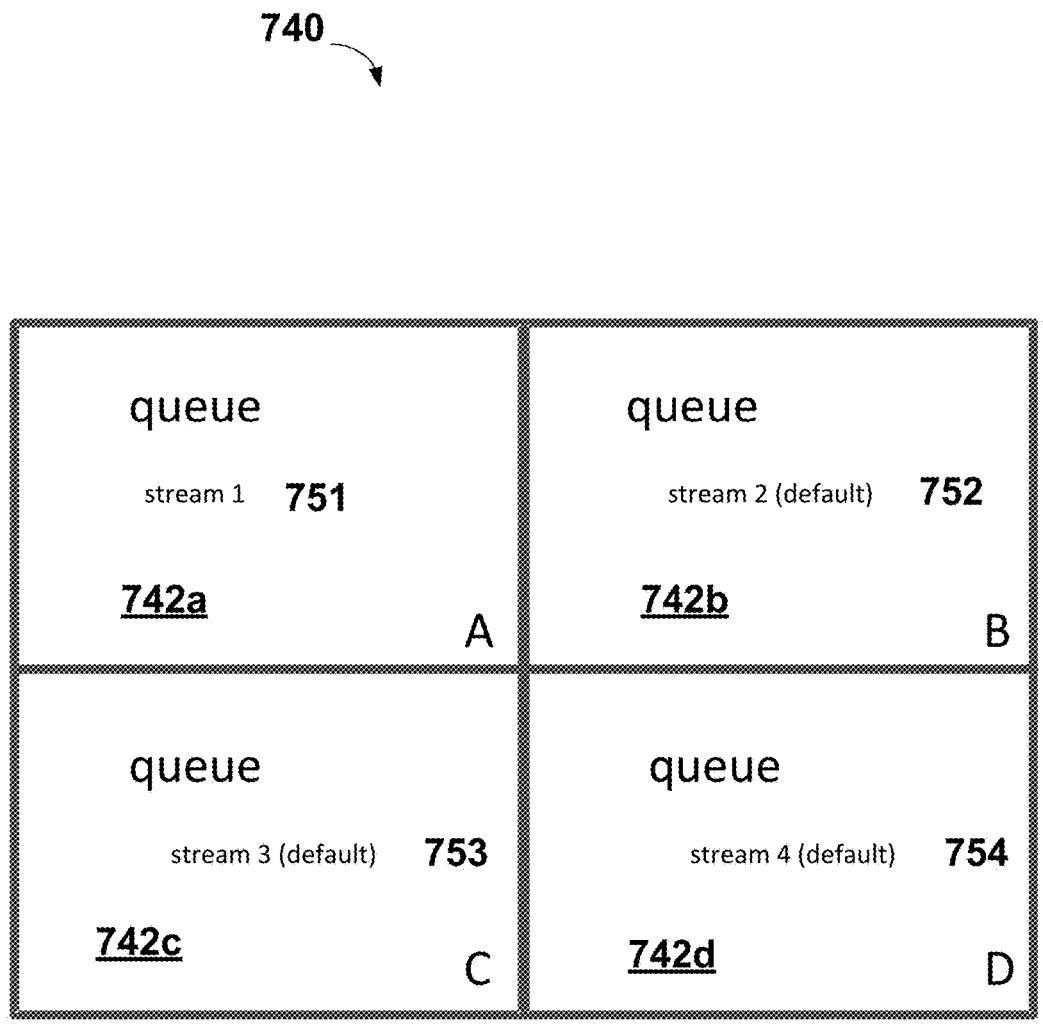
FIG. 7B is a schematic diagram of a four cell layout showing queues and displayed streams according to the invention.
Figure 7C:
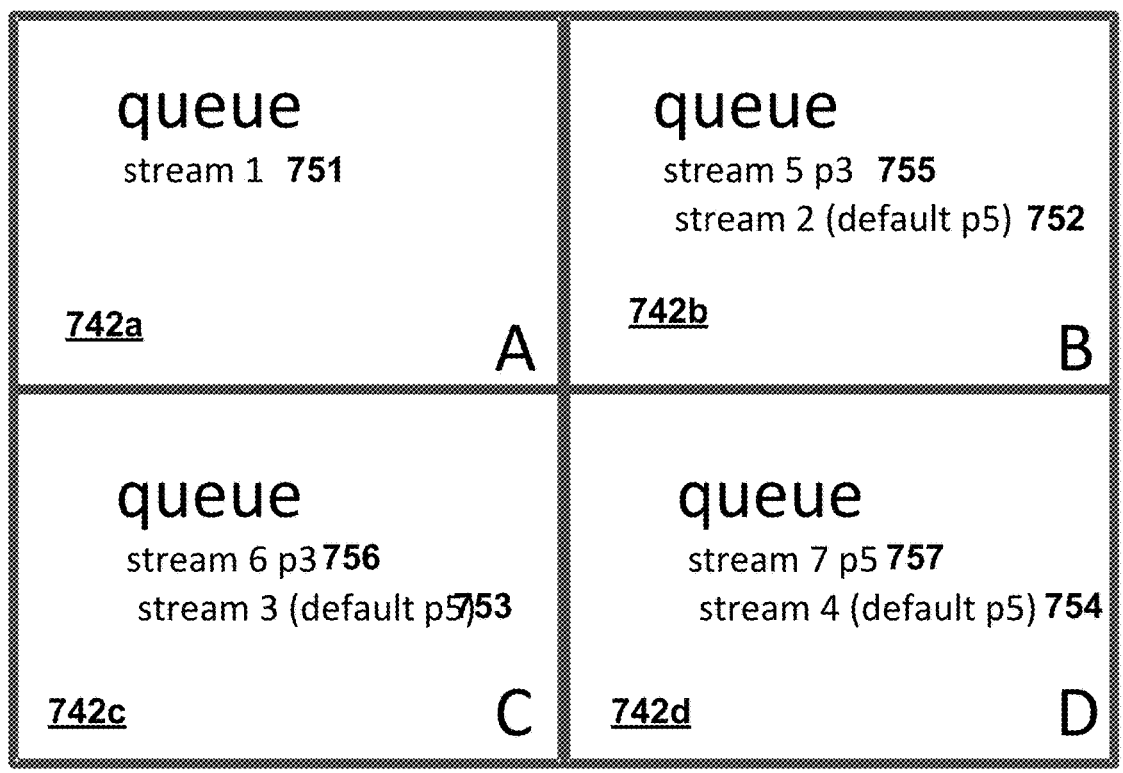
FIG. 7C is a schematic diagram of the four cell layout of FIG. 7C showing additional streams in the cell queues.
Figure 7D:
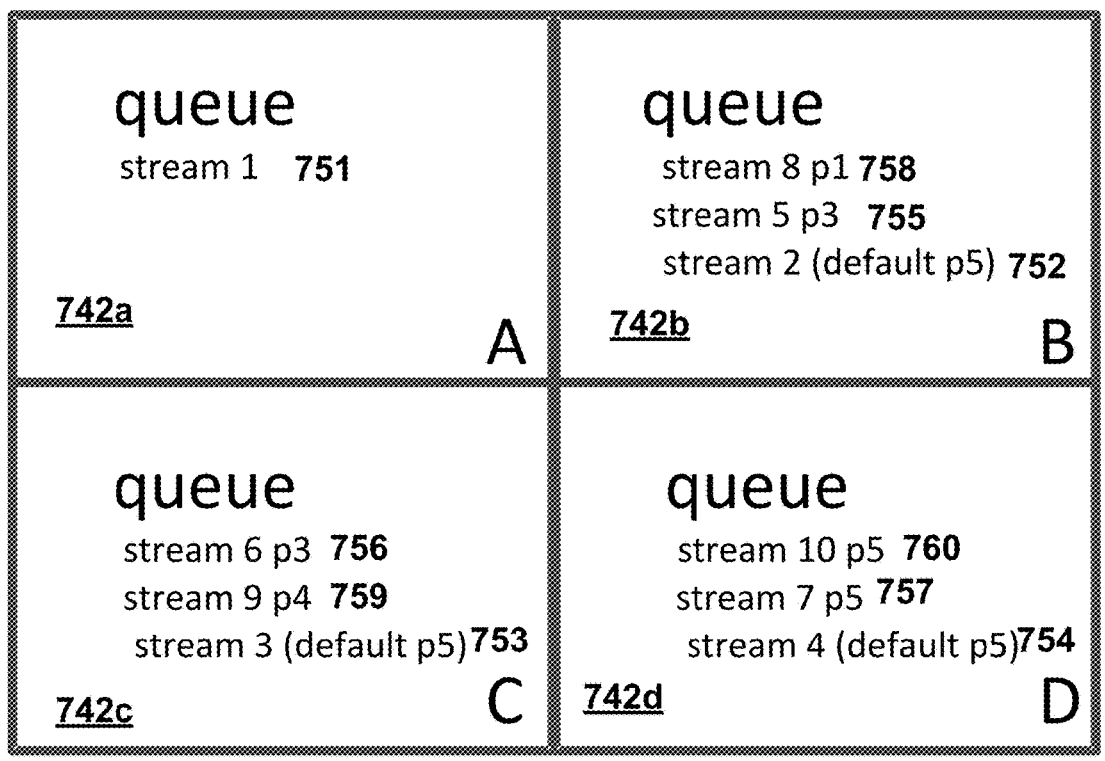
FIG. 7D is a schematic diagram of the four cell layout of FIG. 7C showing additional streams in the cell queues.

FIGS. 7B-7D describe the operation of queues and displayed streams during system activity as scheduled by the view scheduler 350 in conjunction with the rules engine 356. FIG. 7B is a schematic diagram of a four cell 742*a*-742*d* layout. In this example cell A 742*a* is locked cannot grow, but cells B, C, D 742*b*-742*d* are not locked and have queue depth of three. Here, cell A 742*a* displays stream 751 and the unlocked cells 742*b*-742*d* display default streams 752-755 respectively.

Now referring to FIG. 7C the four cell layout of FIG. 7B is modified by processing additional actions to add streams in the cell queues. Here, three incoming streams are processed. Streams 2, 3, 4 752-752 have the lowest priority five, streams 5, 6 755-756 have priority three and stream 7 757 has priority five. Because of priority, streams 755 and 756 are displayed and because stream 757 is newer and is at the top of the queue it is being displayed.

Now referring to FIG. 7D the four cell layout of FIG. 7C is modified by processing additional actions to add three streams to the cell queues. Stream 8 758 has priority one and is displayed. Stream 9 759 has priority four so it is not displayed but is queued. Stream 10 760 has priority five, but it is newer than stream 7 757 and default stream 4 754 so it is displayed.

Figure 7E:
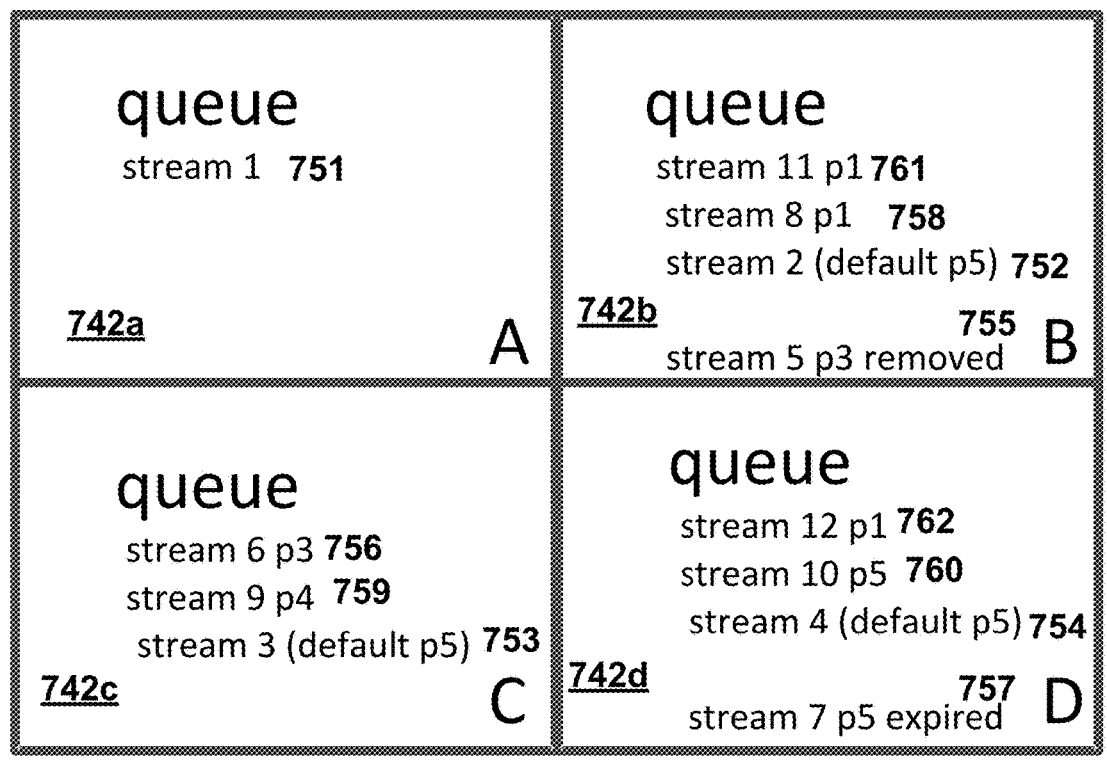
FIG. 7E is a schematic diagram of the four cell layout of FIG. 7C showing additional streams in the cell queues and expired streams.

Now referring to FIG. 7E the four cell layout of FIG. 7C is modified by processing additional actions to add three streams to the cell queues. Incoming Stream 11 761 has priority one and is displayed. Stream 5 757 is removed from queue B in cell 742*b* because the queue has hit a limit. Stream 9 759 has priority four so it is not displayed but is queued. Stream 10 760 has priority five, but it is newer than stream 7 757 and default stream 4 754 so it is displayed. Stream 7 757 has expired so it is removed from queue for cell D 742*d*. Incoming stream 12 762 with priority one goes to cell D 742*d* not cell C 742*c* because cell D 742*d* is the next available cell with the smallest queue (only 2 in queue in cell D 742*d* because stream 7 757 has expired. It is understood, that there are various ways to control the placement and display of incoming streams into one or more cells and the number of cells in a view can grow or shrink.

Figure 8:
FIG. 8 is a screen shot of a graphical user interface used to set up a networked monitor appliance.

Now referring to FIG. 8, a graphical user interface 800 is used to set up and operate an NMA 110 and control operation of the NMA 110. It is possible to configure the NMA while viewing live stream. User interface 800 includes a views control 802, a layout control 804, a streams control 806, a cell order control 808 and a settings control 810. Here the interface is displaying a four by four cell 812*a*-812*d* layout with live images.

Figure 9:
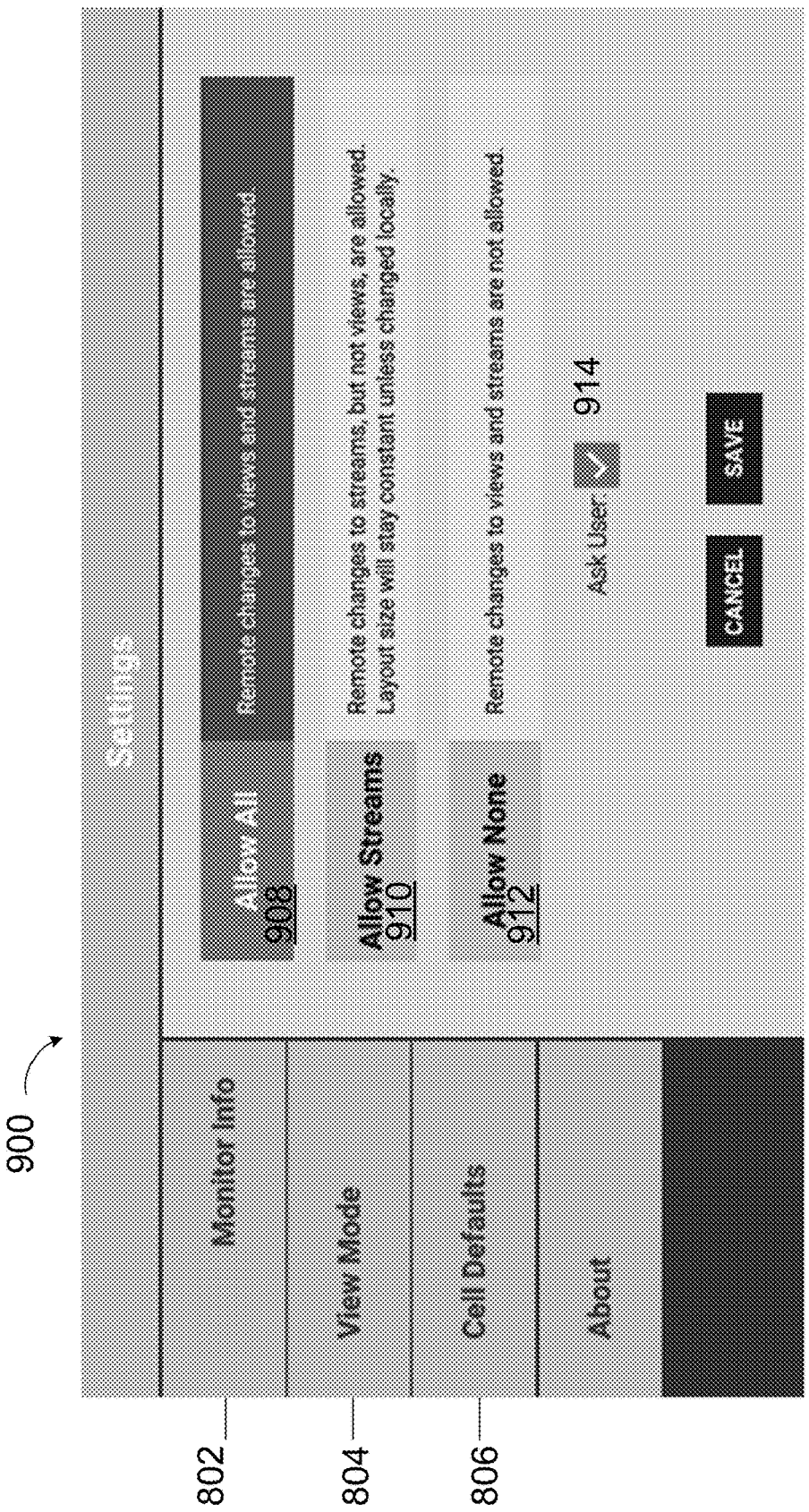
FIG. 9 is a screen shot of a graphical user interface used to set up a networked monitor appliance.

Now referring to FIG. 9, a subset of the graphical user interface 900 is used to adjust settings of the NMA 110 when the settings control 810 is selected. It is understood, that the graphical user interface 900 can include additional buttons, controls and menus, for example a Devices button (not shown) to query and select source devices. In one embodiment the following rules determine what is displayed by the NMA:

Allow All 908 selection allows streams and views to be changed via remote request and the layout may grow or shrink as streams are added or removed;

Allow Streams 910 selection allows streams to only be changed via remote request, views cannot be changed via remote request, and layout size will not change;

Allow None 912 selection rejects remote requests for stream or view changes; and Ask User 914 check box when check causes the local NMA 110 user to be queried as to whether they want to accept an incoming stream or view change for the local NMA 110. In one embodiment the User can specify via options which view to display on startup if there is no video stream.

With Allow All 908 selected, the layout can be changed if a new view is pushed, but will never change automatically. Streams are placed into a particular cell based on priority and cell attributes and remote view change requests are rejected. With Ask User 914 checked, the NMA 110 will query the user before accepting or rejecting an incoming stream or view change request If mode Allow Streams 910 is selected, then user will be queried to accept or reject the stream request and incoming view requests will still be automatically rejected.

Remote operations from NMA controllers 120 include:
Upload View to NMA 110;
Administration functions;
Remote change of views on NMA 110 either by operator function or driven by events if the view has been previously uploaded;
Push Stream to any cell or specific cell either by operator function or driven by events;
Expire a stream (typically driven by events, but can also be an operator function);
Expire a view (typically driven by events, but can also be an operator function);
Remote Operations API supports various functions such as:
Push a stream by specify an NMA 110, specify priority, TTL (time to live), specify a cell (e.g., "a, b, c, d, e, f" honored if specified cell allows the operation). Other cell features, including but not limited to, border color and informational text to overlay on image can also be specified.

Figure 10:
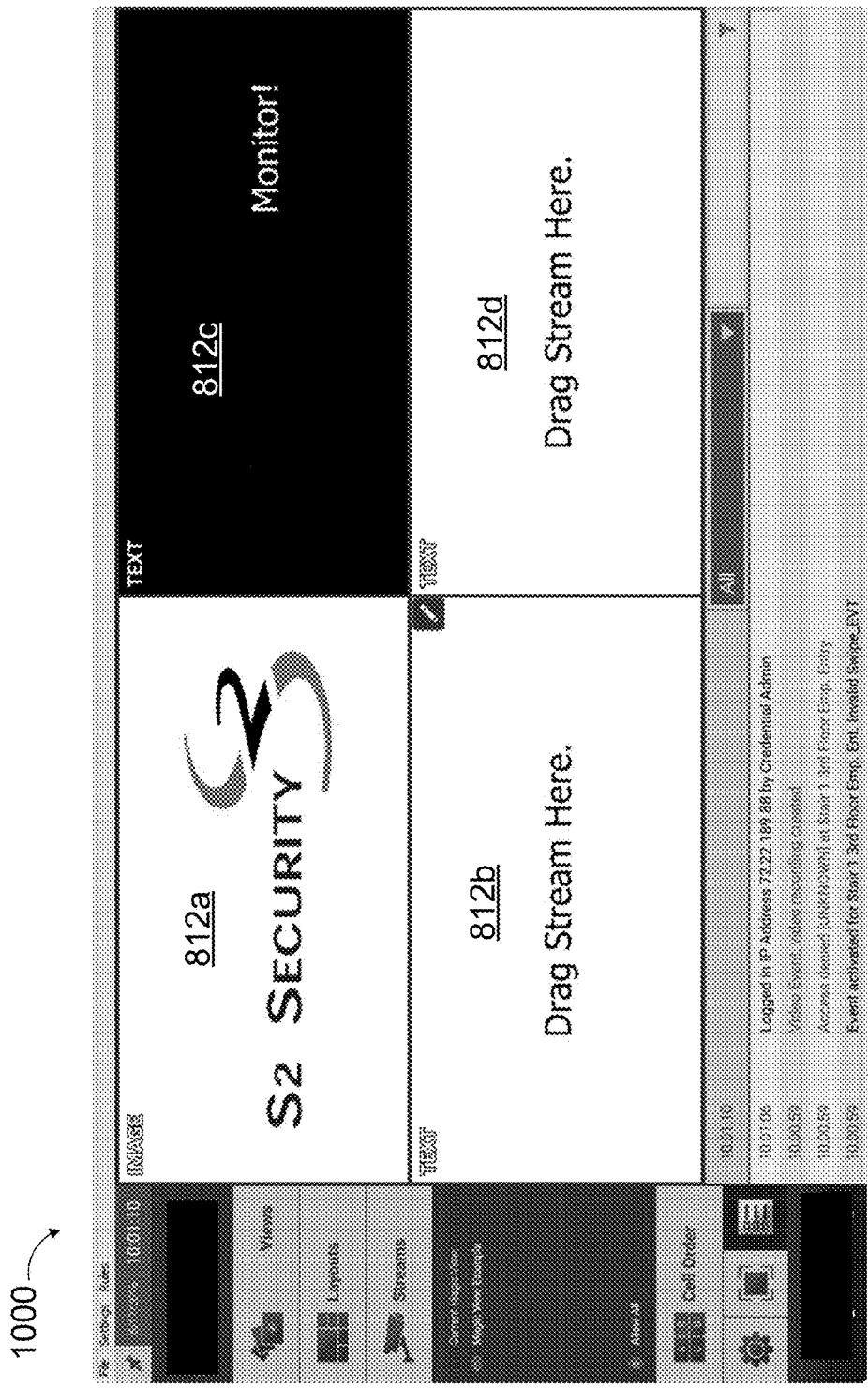
FIG. 10 is a screen shot of a graphical user interface showing a networked monitor appliance including cell order and digital signage display in certain cells.
Figure 11:
FIG. 11 is a screen shot of a graphical user interface used to set up layouts on a view on the networked monitor appliance of FIG. 2.
Figure 12:
FIG. 12 is a screen shot of a graphical user interface used to set up a cell order on a view on the networked monitor appliance of FIG. 2.

FIG. 10 is a screen shot 1000 of a graphical user interface showing a networked monitor appliance including cell order and digital signage display in certain cells, here 812*a*. Also displayed is an activity log 1010. FIG. 11 is a screen shot 1100 of a graphical user interface used to set up layouts on a view. The user can select one of several default layouts 1112*a*-1112*n*. Here layout 1112*m*, a three by three layout is selected and the current video streams are displayed. FIG. 12 is a screen shot 1200 of a graphical user interface used to set up a cell order on a view. The user can use drag and drop operations to re-label the cells to change cell display order. The user can select edit mode 1204, use default order 1206 and can save all changes 1208.

In one embodiment, the NMA can run in fully automatic mode with no user input required. One embodiment is implemented with Qt together with C++. The UI elements will be programmed in QML. OpenGL will be used to render video frames as textures. The FFMPEG library will be used to decode video frames. The protocols used to setup, stream and monitor quality of service of video streams (using H.264 video codecs) include Real Time Streaming Protocol (RTSP), Real-time Transport Protocol (RTP) & RTP Control Protocol (RTCP) For MJPEG, HTTP is used. The RTSP connection will use Transmission Control Protocol (TCP) to provide reliability and RTP and RTCP will use User Datagram Protocol (UDP to ensure efficient streaming. TCP can be used to reduce the number of ports required to get through firewalls The HTTP protocol will be used to communicate with the security system 130 Restful API, together with JavaScript Object Notation (JSON) to transmit data objects. Extensible Markup Language (XML) or JSON is be used to store various pieces of information such as the characteristic to describe a view.

In other embodiments, to facilitate the creation of video walls, a MNMA 110*a* may be linked with multiple SNMAs 111*a*-111*n*. The MNMA 110*a* expands its canvas to cover the geometric layout of the physical monitors that comprise the video wall. Typical arrangements of monitors on video walls include two-up, three-up, and quad. The MNMA 110*a* uses linking of views such that when a given view is displayed on the MNMA 110*a*, the correct related view will be displayed on each of the SNMAs 111. These techniques and arrangements facilitate simple video walls.

All publications and references cited herein are expressly incorporated herein by reference in their entirety. Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A system to display video over a network comprising:
at least one networked monitor appliance comprising:
a network interface coupled to the network;
a local database coupled to the network interface adapted to receive predetermined resource information from at least one networked monitor controller;
a command interface coupled to the network interface and the local database adapted to receive commands from the at least one networked monitor controller including:
registration data;
at least one view; and
at least one video display request;
a view scheduler coupled to the local database;
a rules engine coupled to the view scheduler;
a video stream processor coupled to the view scheduler and adapted to receive a plurality of prerecorded incoming video streams;
at least one video display monitor coupled to the view scheduler; and
wherein the view scheduler and the rules engine specify operation of the networked monitor appliance in processing the plurality of incoming video streams and displaying corresponding video content such that the displayed prerecorded incoming video streams are displayed in a managed layout according to one of:
priority;
security events;
user control;
timers;
rules provided to the rules engine; and
video stream bandwidth limitations.

2. The system of claim 1, wherein the networked monitor appliance further comprises a slave processor and a networked monitor appliance command interface.

3. The system of claim 2, wherein the networked monitor appliance command interface further comprises an event engine coupled to the rules engine, the view scheduler and the video stream processor.

4. The system of claim 3, wherein the event engine is adapted to receive security events from at least one of:
a global security control system;
a local security control system;
the at least one networked monitor controller; and
a mobile application.

5. The system of claim 1, wherein the at least one incoming video stream originates from:
a crowd sourced video.

6. The system of claim 5, wherein the at least one video stream includes a token to authenticate the at least one video stream.

7. The system of claim 1, wherein the networked monitor appliance further comprises a Human Machine Interface (HMI) coupled to the network interface.

8. The system of claim 1, wherein the networked monitor appliance further comprises at least one predetermined default incoming video stream request processing rule.

9. The system of claim 1, wherein the at least one networked monitor controller comprises one of:
a security system;
a digital video recorder (DVR);
a forensic desktop; and
an access control system; and
wherein the at least one networked monitor controller further comprises:
a network interface coupled to the network;
a view manager coupled to the network interface;
a view builder coupled to the network interface.

10. A computer-implemented method to display video stream across a network comprising:
configuring a network monitor appliance including naming the network monitor appliance;
registering the named network monitor appliance;
building a view for the named network monitor appliance;
activating the view on the named network monitor appliance;
receiving a prerecorded video stream corresponding to the activated view;
applying a set of rules to the video stream to determine a display priority and configuration;
scheduling the video stream according to the set of rules;
managing a layout of the prerecorded incoming video streams according to one of:
priority;
security events;
user control;
timers;
rules provided to the rules engine; and
video stream bandwidth limitations; and
displaying the prerecorded incoming video streams in the view on at least one display monitor of the named network monitor appliance.

11. The method of claim 10, wherein activating a view further comprises:
receiving an event;
processing the event; and
generating a video display request to the named network monitor appliance to activate the view.

12. The method of claim 11 further comprising canceling the activated view in response to resolving the event.

13. The method of claim 10, wherein activating the view further comprises:
generating a video display request to the named network monitor appliance to activate the view in response to a command from a user interface.

14. The method of claim 10 further comprising locking the view for display.

15. The method of claim 10 further comprising deactivating the view in response to one of:
receiving a command to deactivate the view;
detecting an expiration of a view life timer;
receiving a dismissal through a user interface of the named network monitor appliance; and
resolving an event which activated the view and receiving a deactivation command.

16. The method of claim 10 further comprising sharing the view on the network monitor appliance with second network monitor appliance.

17. The method of claim 10, wherein the video stream includes a secure stream handle, a source designator, a start time, a duration, and an encoding method.

18. The method of claim 17, wherein the secure video stream handle is a temporary, randomly generated, authentication token obtained through a secure process, and becomes invalid when one of:
the video stream corresponding to the secure video steam handle is closed; and
an underlying connection is dropped.

19. The method of claim 10 further comprising sending an identity packet in response to receiving a source system identification configuration command from a networked monitor appliance controller.

20. The method of claim 10 further comprising operating in response to a request in one of:
a black screen configuration; and
a white screen configuration.

21. The method of claim 10 further comprising:
providing a user interface to user to drag and drop a plurality of icons representing a corresponding plurality of cameras onto the view;
automatically arranging the video streams from the corresponding plurality of cameras in a plurality of windows; and
allowing a user to rearrange the video streams from the corresponding plurality of cameras in the plurality of windows.

22. The method of claim 10 further comprising including location information, time stamp and authenticity data in the at least one video stream.

23. The method of claim 10 further comprising generating a stream search request.

24. The method of claim 10 further comprising displaying digital signage.

25. The method of claim 10 further comprising displaying a plurality of steams in a carousel mode.

26. A computer-readable non-transitory storage medium having instructions stored thereon for processing data information, such that the instructions, when carried out by a processing device, enable the processing device to perform operations of:
configuring a network monitor appliance including naming the network monitor appliance;
building a view for the named network monitor appliance;
activating a view on the named network monitor appliance;
receiving a video stream corresponding to the activated view;
applying a set of rules to the video stream to determine a display priority and configuration; and
managing a layout of the prerecorded incoming video streams according to one of:
priority;
security events;
user control;
timers;
rules provided to the rules engine; and
video stream bandwidth limitations;
displaying the prerecorded incoming video streams in a view on at least one display monitor of the named network monitor appliance.

* * * * *